United States Patent
Kohinata

(10) Patent No.: US 11,174,573 B2
(45) Date of Patent: Nov. 16, 2021

(54) PRODUCTION METHOD OF NONWOVEN FABRIC

(71) Applicant: Sumitomo Chemical Company, Limited, Tokyo (JP)

(72) Inventor: Yusaku Kohinata, Tokyo (JP)

(73) Assignee: SUMITOMO CHEMICAL COMPANY, LIMITED, Tokyo (JP)

(*) Notice: Subject to any disclaimer, the term of this patent is extended or adjusted under 35 U.S.C. 154(b) by 174 days.

(21) Appl. No.: 16/489,447

(22) PCT Filed: Feb. 21, 2018

(86) PCT No.: PCT/JP2018/006187
§ 371 (c)(1),
(2) Date: Aug. 28, 2019

(87) PCT Pub. No.: WO2018/159407
PCT Pub. Date: Sep. 7, 2018

(65) Prior Publication Data
US 2019/0382923 A1    Dec. 19, 2019

(30) Foreign Application Priority Data
Mar. 3, 2017  (JP) .............................. JP2017-040366

(51) Int. Cl.
*D01D 5/084* (2006.01)
*D01D 5/098* (2006.01)
(Continued)

(52) U.S. Cl.
CPC .............. *D01F 6/76* (2013.01); *C08G 75/23* (2013.01); *D01D 5/0985* (2013.01); *D01F 6/765* (2013.01);
(Continued)

(58) Field of Classification Search
CPC .......... D01D 5/08; D01D 5/084; D01D 5/098; D01D 5/0985; D01D 7/00; D01F 6/76;
(Continued)

(56) References Cited

U.S. PATENT DOCUMENTS 5,652,050 A * 7/1997 Pall ...................... D01D 5/0985
                                                          442/394
6,280,880 B1   8/2001 Schwoebel et al.
(Continued)

FOREIGN PATENT DOCUMENTS

CN      103088446 A    5/2013
JP      2001055666 A   2/2001
(Continued)

OTHER PUBLICATIONS

Int'l Search Report dated May 15, 2018 in Int'l Application No. PCT/JP2018/006187.
Office Action dated Jun. 1, 2021 in CN Application No. 201880015215.7 (with English Machine Translation).

*Primary Examiner* — Leo B Tentoni
(74) *Attorney, Agent, or Firm* — Panitch Schwarze Belisario & Nadel LLP

(57) ABSTRACT

A method for producing a nonwoven fabric is provided. The method includes spinning a molten aromatic polysulfone resin from a nozzle and extending it with a high temperature fluid ejected at high speed, thereby obtaining the aromatic polysulfone resin in a fibrous form, and collecting the aromatic polysulfone resin obtained in a fibrous form on a moving collecting member. The aromatic polysulfone resin has a melt mass flow rate of 130 g/10 min or more under conditions of a test temperature of 400° C. and a nominal load of 2.16 kg, which is determined based on ASTM D 1238. A distance from the nozzle to the collecting member is set to 30 mm or less.

9 Claims, 2 Drawing Sheets

(51) Int. Cl.
 *D01D 7/00* (2006.01)
 *D01F 6/76* (2006.01)
 *C08G 75/23* (2006.01)
 *D04H 3/009* (2012.01)
 *D04H 3/16* (2006.01)

(52) U.S. Cl.
 CPC .............. *D04H 3/009* (2013.01); *D04H 3/16* (2013.01); *D10B 2331/301* (2013.01)

(58) Field of Classification Search
 CPC .......... D01F 6/765; D04H 3/009; D04H 3/16; D10B 2331/301
 USPC ...... 264/103, 210.8, 211.12, 211.14, 211.17, 264/331.11, 555
 See application file for complete search history.

(56) References Cited

U.S. PATENT DOCUMENTS

| | | |
|---|---|---|
| 2009/0047515 A1 | 2/2009 | Kohinata et al. |
| 2012/0141908 A1* | 6/2012 | Schmidt .............. H01M 8/1041 429/482 |
| 2012/0152823 A1 | 6/2012 | Okamoto et al. |
| 2015/0225522 A1* | 8/2015 | Khan .................. C09D 171/00 428/379 |
| 2016/0076170 A1* | 3/2016 | Blaney ................ D01D 5/0985 428/212 |

FOREIGN PATENT DOCUMENTS

| | | |
|---|---|---|
| JP | 2002061063 A | 2/2002 |
| JP | 2004348984 A | 12/2004 |
| JP | 2008308810 A | 12/2008 |

\* cited by examiner

PRODUCTION METHOD OF NONWOVEN FABRIC

CROSS-REFERENCE TO RELATED APPLICATION

This application is a Section 371 of International Application No. PCT/JP2018/006187, filed Feb. 21, 2018, which was published in the Japanese language on Sep. 7, 2018 under International Publication No. WO 2018/159407 A1, which claims priority under 35 U.S.C. § 119(b) to Japanese Application No. 2017-040366, filed Mar. 3, 2017, the disclosures of which are incorporated herein by reference in their entirety.

TECHNICAL FIELD

The present invention relates to a method for producing a nonwoven fabric.

BACKGROUND ART

Conventionally, as a method for producing a nonwoven fabric which uses a microfiber as a forming material, a melt blowing method is preferably used. The melt blowing method is a production method which does not require a binder resin. In the melt blowing method, fibrous resins can be intertwined or fused with each other to form a web of microfibers. According to such a melt blowing method, no solvent is required at the time of spinning, which makes it relatively simple and can minimize the adverse effects of the residual solvent.

For a nonwoven fabric produced by the melt blowing method, general purpose resins such as polyolefin-based resins are mainly used. However, nonwoven fabrics produced using these resins have insufficient heat resistance. Therefore, nonwoven fabrics having favorable heat resistance are required for applications used at high temperatures. For example, Patent Document 1 describes a nonwoven fabric using a wholly aromatic polyester as a resin in order to improve the heat resistance.

CITATION LIST

Patent Document

[Patent Document 1] Japanese Unexamined Patent Application, First Publication No. 2002-061063

SUMMARY OF INVENTION

Technical Problem

However, the nonwoven fabrics are required to further improve the heat resistance according to the market demand. The present invention has been made in view of such circumstances, with an object of providing a method for producing a nonwoven fabric, which is capable of obtaining a nonwoven fabric excellent in heat resistance.

Solution to Problem

The inventors of the present invention conducted intensive studies in order to produce a nonwoven fabric excellent in heat resistance by a melt blowing method using an aromatic polysulfone resin having a high glass transition temperature. As a result, although the nonwoven fabric was obtained, the mechanical strength of the nonwoven fabric was insufficient in some cases. Accordingly, the inventors of the present invention discovered that the nonwoven fabric excellent in mechanical strength can be produced by intensively studying the production conditions of the nonwoven fabric by the melt blowing method, and completed the present invention.

One aspect of the present invention provides a method for producing a nonwoven fabric, the method including: a step for spinning a molten aromatic polysulfone resin from a nozzle and obtaining a fibrous aromatic polysulfone resin with a high temperature and high velocity fluid; and a step for collecting the fibrous aromatic polysulfone resin on a moving collecting member, wherein those having a melt mass flow rate (test temperature: 400° C., nominal load: 2.16 kg) determined by an extruder based on ASTM D 1238 of 130 g/10 min or more are used as the aromatic polysulfone resin, and a distance from the nozzle to the collecting member is set to 30 mm or less in the collecting step.

In one aspect of the present invention, it is also possible to configure as a production method using an aromatic polysulfone resin having 80 mol % to 100 mol % of repeating units represented by the following formula (1) with respect to the total of all the repeating units.

$$-Ph^1-SO_2-Ph^2-O- \qquad (1)$$

($Ph^1$ and $Ph^2$ each independently represent a phenylene group. Hydrogen atoms in the phenylene group may be each independently substituted with an alkyl group, an aryl group or a halogen atom.)

That is, the present invention includes the following aspects.

[1] A method for producing a nonwoven fabric, the method including steps for: spinning a molten aromatic polysulfone resin from a nozzle and extending it with a high temperature fluid ejected at high speed, thereby obtaining the aforementioned aromatic polysulfone resin in a fibrous form, and collecting the aforementioned aromatic polysulfone resin obtained in a fibrous form on a moving collecting member; wherein the aforementioned aromatic polysulfone resin has a melt mass flow rate of 130 g/10 min or more under conditions of a test temperature of 400° C. and a nominal load of 2.16 kg, which is determined based on ASTM D 1238; and a distance from the aforementioned nozzle to the aforementioned collecting member is set to 30 mm or less.

The method for producing a nonwoven fabric according to [1], wherein a content of a repeating unit represented by the following formula (1)' in the aforementioned aromatic polysulfone resin is from 80 mol % to 100 mol % with respect to the total amount (number of moles) of all the repeating units constituting the aforementioned aromatic polysulfone resin:

$$-Ph^1-SO_2-Ph^2-O- \qquad (1)'$$

[In formula (1), $Ph^1$ and $Ph^2$ represent a phenylene group; and at least one hydrogen atom in the aforementioned phenylene group may each independently be substituted with an alkyl group having 1 to 10 carbon atoms, an aryl group having 6 to 20 carbon atoms or a halogen atom.]

Advantageous Effects of Invention

According to one aspect of the present invention, there is provided a method for producing a nonwoven fabric, by which a nonwoven fabric having excellent heat resistance and excellent mechanical strength can be obtained.

DESCRIPTION OF EMBODIMENTS

<Method for Producing Nonwoven Fabric>

Figure 1:
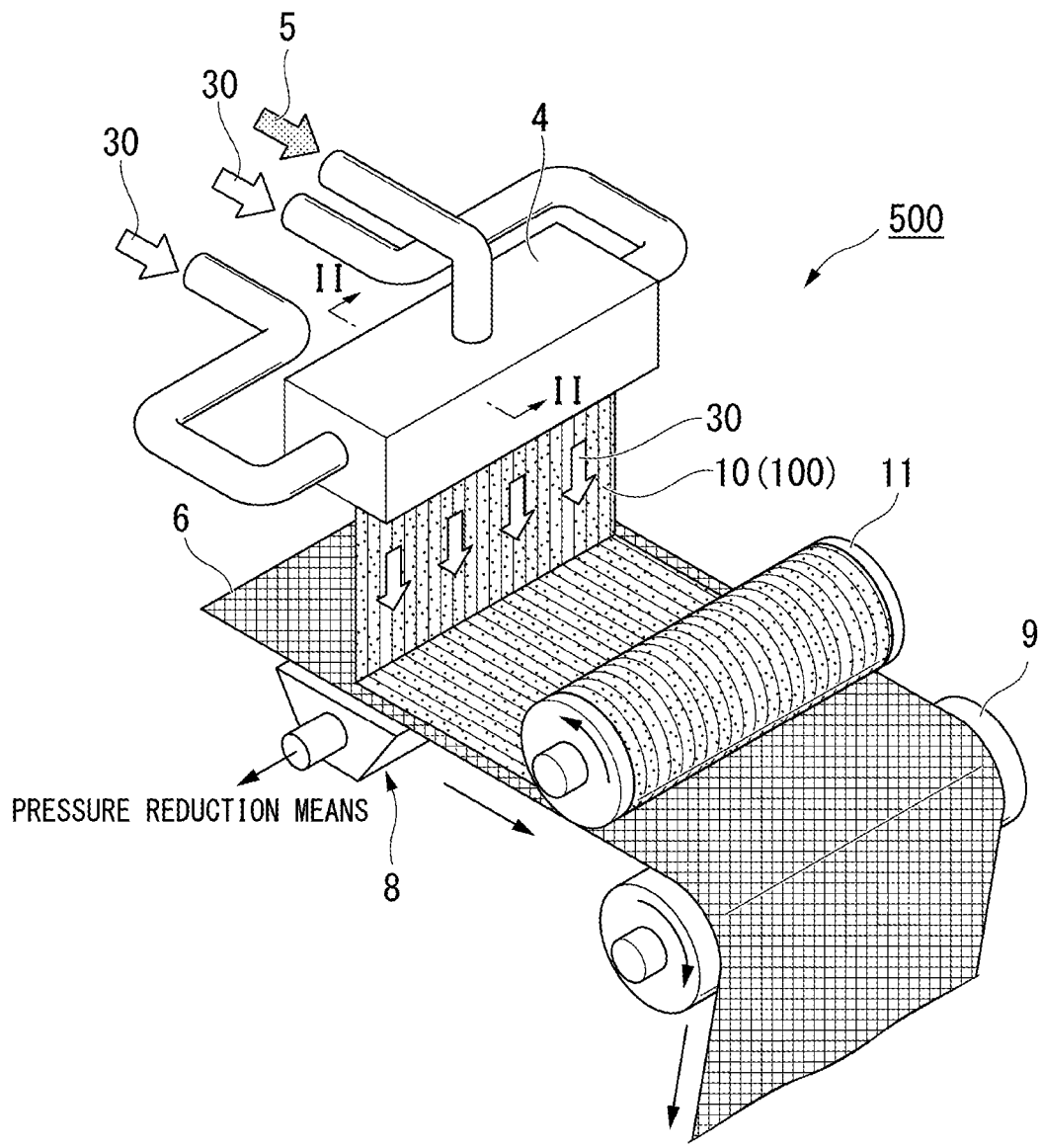
FIG. 1 is a schematic perspective view showing a conventional melt blowing apparatus.

Hereinafter, a method for producing a nonwoven fabric according to an embodiment of the present invention will be described with reference to FIG. 1 and FIG. 2. It should be noted that in the drawings, in order to make the drawings easier to see, dimensions, ratios and the like of each constituent are appropriately changed.

The nonwoven fabric produced by the production method of the present embodiment includes an aromatic polysulfone resin as a forming material. Aromatic polysulfone resins have glass transition temperatures higher than those of polyolefin-based resins that are conventionally used as forming materials of nonwoven fabrics. Therefore, a nonwoven fabric containing an aromatic polysulfone resin as a forming material is excellent in heat resistance. The aromatic polysulfone resin which can be suitably used in the production method of the present embodiment will be described later.

In one aspect, the nonwoven fabric produced by the production method of the present embodiment includes an aromatic polysulfone resin and other components. The content of the other components is preferably from 0.1 to 30% by mass with respect to the total mass of the nonwoven fabric. Examples of the other component include residual solvents, antioxidants, heat resistant processing stabilizers and viscosity modifiers.

In another aspect, the nonwoven fabric produced by the production method of the present embodiment may be composed only of the aromatic polysulfone resin.

It should be noted that the term "nonwoven fabric" in the present specification refers to a sheet-like product with specific properties in which fibers are not woven but are intertwined, fibers are oriented in one direction or at random, and fibers are bonded with each other by fusion.

[Production Apparatus of Meltblown Nonwoven Fabric]

As a method for producing a nonwoven fabric according to an embodiment of the present invention, a melt blowing method is used from the viewpoints that it does not require a solvent at the time of spinning, is relatively simple and can minimize the adverse effects of the residual solvent. In the case of producing a nonwoven fabric by a melt blowing method, a conventionally known melt blowing apparatus can be used as a spinning apparatus. FIG. 1 is a schematic perspective view showing a conventional melt blowing apparatus. FIG. 2 is a cross-sectional view taken along the line II-II of a melt blowing die included in the apparatus in FIG. 1. It should be noted that in the following description, the terms "upstream side" and "downstream side" may be used in accordance with the movement direction of a collecting conveyor 6.

As shown in FIG. 1, a melt blowing apparatus 500 includes a melt blowing die 4, a mesh-like collecting conveyor 6 provided below the melt blowing die 4, and a suction mechanism 8 provided below the collecting conveyor 6. It should be noted that in the present specification, the collecting conveyor 6 corresponds to the collecting member in the Claims.

A take-up roller 11 for winding up a nonwoven fabric 100 is disposed on the downstream side of the melt blowing die 4 and above the collecting conveyor 6. In FIG. 1, a transport roller 9 for transporting the collecting conveyor 6 is disposed on the downstream side of the take-up roller 11 and below the collecting conveyor 6.

Figure 2:
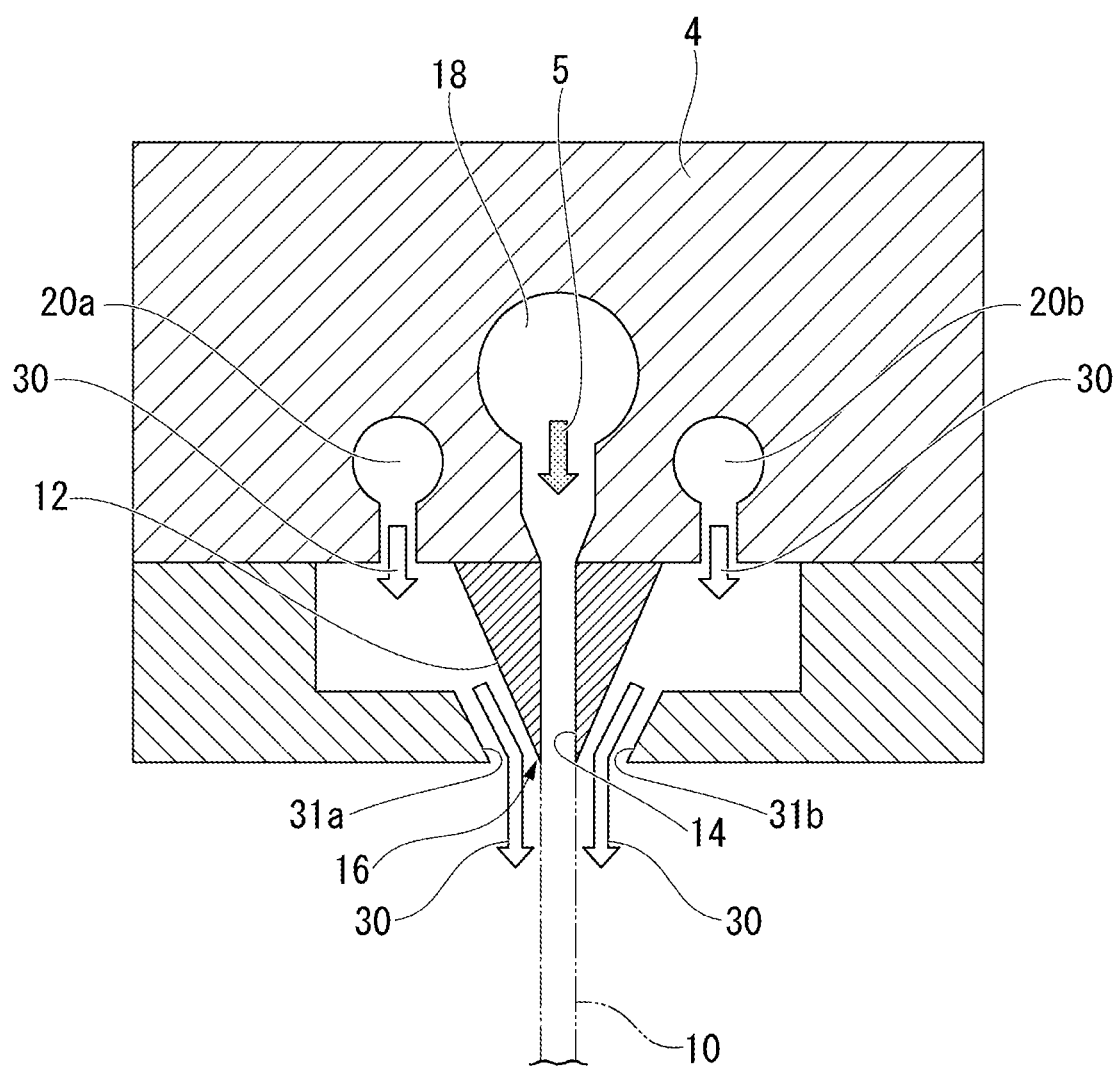
FIG. 2 is a cross-sectional view taken along the line II-II of a melt blowing die included in the apparatus in FIG. 1.

As shown in FIG. 2, a die nose 12 having an isosceles triangular cross-sectional shape is disposed on the lower surface side of the melt blowing die 4. A nozzle 16 in which a plurality of small holes 14 are arranged in the paper penetrating direction is disposed at the center of the tip of the die nose 12. Further, a molten resin 5 supplied into a resin passage 18 is extruded downward from each of the small holes 14 in the nozzle 16. It should be noted that in FIG. 2, only one extruded fiber 10 is shown.

The diameter of the small holes 14 formed in the nozzle 16 is usually in the range of 0.05 mm to 0.4 mm. When the diameter of the small holes 14 is within the above range, the productivity and processing accuracy of the nonwoven fabric are excellent.

The distance between the small holes 14 is usually in the range of 0.01 to 6.0 mm, and preferably 0.15 to 4.0 mm, depending on the average fiber diameter of the nonwoven fabric to be required. When the distance between the holes is within the above range, the dimensional stability and strength of the nonwoven fabric are excellent.

On the other hand, in the melt blowing die 4, a slit 31a and a slit 31b are formed so as to sandwich the row of the small holes 14 in the nozzle 16 from both sides. A fluid passage 20a and a fluid passage 20b are configured by the slit 31a and the slit 31b. Further, a high temperature fluid 30 sent from the fluid passage 20a and the fluid passage 20b is ejected obliquely downward at high speed at the time of extruding the molten resin 5.

The melt blowing apparatus 500 is configured as described above.

[Aromatic Polysulfone Resin]

The aromatic polysulfone resin according to the production method of the present embodiment is typically a resin including a repeating unit that contains a divalent aromatic group (that is, a residue obtained by removing, from an aromatic compound, two hydrogen atoms bonded to its aromatic ring), a sulfonyl group (—$SO_2$—) and an oxygen atom.

The aromatic polysulfone resin preferably has a repeating unit represented by a formula (1) (hereinafter sometimes referred to as "repeating unit (1)") from the viewpoint of improving the heat resistance and chemical resistance. It should be noted that in the present specification, the aromatic polysulfone resin having the repeating unit (1) may be referred to as an aromatic polyether sulfone resin. The aromatic polysulfone resin according to the production method of the present embodiment may further have, in addition to the repeating unit (1), at least one other repeating unit such as a repeating unit represented by a formula (2) (hereinafter sometimes referred to as "repeating unit (2)") and a repeating unit represented by a formula (3) (hereinafter sometimes referred to as "repeating unit (3)").

In the aromatic polysulfone resin according to the production method of the present embodiment, the content of the repeating unit represented by the formula (1) is preferably from 80 mol % to 100 mol % with respect to the total amount (number of moles) of all the repeating units constituting the aromatic polysulfone resin.

$$Ph^1-SO_2-Ph^2-O- \qquad (1)$$

[In formula (1), $Ph^1$ and $Ph^2$ represent a phenylene group, and at least one hydrogen atom in the aforementioned phenylene group may each independently be substituted with an alkyl group having 1 to 10 carbon atoms, an aryl group having 6 to 20 carbon atoms or a halogen atom.]

 (2)

[In formula (2), $Ph^3$ and $Ph^4$ represent a phenylene group; at least one hydrogen atom in the aforementioned phenylene group may each independently be substituted with an alkyl group having 1 to 10 carbon atoms, an aryl group having 6 to 20 carbon atoms or a halogen atom; and R represents an alkylidene group having 1 to 5 carbon atoms, an oxygen atom or a sulfur atom.]

 (3)

[In formula (3), $Ph^5$ represents a phenylene group, at least one hydrogen atom in the aforementioned phenylene group may each independently be substituted with an alkyl group having 1 to 10 carbon atoms, an aryl group having 6 to 20 carbon atoms or a halogen atom; and n represents an integer of 1 to 3, and when n is 2 or more, a plurality of $Ph^5$ groups may be the same or different from each other.]

The phenylene group represented by any one of $Ph^1$ to $Ph^5$ may be each independently a p-phenylene group, an m-phenylene group or an o-phenylene group, but it is preferably a p-phenylene group.

Examples of the alkyl group having 1 to 10 carbon atoms which may substitute the hydrogen atom in the phenylene group include a methyl group, an ethyl group, an n-propyl group, an isopropyl group, an n-butyl group, an isobutyl group, a sec-butyl group, a tert-butyl group, an n-pentyl group, an n-hexyl group, an n-heptyl group, a 2-ethylhexyl group, an n-octyl group and an n-decyl group.

Examples of the aryl group having 6 to 20 carbon atoms which may substitute the hydrogen atom in the phenylene group include a phenyl group, an o-tolyl group, an m-tolyl group, a p-tolyl group, a 1-naphthyl group and a 2-naphthyl group.

Examples of the halogen atom which may substitute the hydrogen atom in the phenylene group include a fluorine atom, a chlorine atom, a bromine atom and an iodine atom.

In the case where the hydrogen atom in the phenylene group is substituted with these groups, the number thereof, for each of the above phenylene groups, is preferably each independently 2 or less, and more preferably 1.

Examples of the alkylidene group having 1 to 5 carbon atoms represented by R include a methylene group, an ethylidene group, an isopropylidene group and a 1-butylidene group.

It is more preferable that the aromatic polysulfone resin according to the production method of the present embodiment have only the repeating unit (1) as the repeating unit. It should be noted that the aromatic polysulfone resin may have two or more of the repeating units (1) to (3) independently of each other.

The reduced viscosity (unit: dL/g) of the aromatic polysulfone resin according to the production method of the present embodiment is preferably 0.25 or more, and more preferably 0.30 or more and 0.50 or less. Usually, it can be said that the molecular weight of the resin increases as the value of the reduced viscosity increases.

The higher the reduced viscosity of the aromatic polysulfone resin, the easier the mechanical strength of the obtained nonwoven fabric improves. If the reduced viscosity of the aromatic polysulfone resin is 0.25 or more, sufficient mechanical strength can be obtained when formed into the nonwoven fabric. On the other hand, when the reduced viscosity of the aromatic polysulfone resin is 0.50 or less, the melt temperature and melt viscosity of the aromatic polysulfone resin do not become too high, and the aromatic polysulfone resin exhibits favorable fluidity. When the aromatic polysulfone resin exhibits favorable fluidity, the productivity of the aromatic polysulfone resin becomes favorable.

The reduced viscosity of the aromatic polysulfone resin according to the production method of the present embodiment is a value measured at 25° C. with an Ostwald type viscosity tube using an N,N-dimethylformamide solution having a concentration of the aromatic polysulfone resin of 1 g/dL.

The aromatic polysulfone resin according to the production method of the present embodiment is a resin having a melt mass flow rate (test temperature: 400° C., nominal load: 2.16 kg) (hereinafter sometimes abbreviated as MFR) determined based on ASTM D 1238 of 130 g/10 min or more.

Here, the melt mass flow rate of a resin is a numerical value indicating the fluidity of the resin at the time of melting. This means that the higher the MFR of the aromatic polysulfone resin, the higher the fluidity of the aromatic polysulfone resin at the time of melting.

The MFR of the aromatic polysulfone resin is preferably 150 g/10 min or more, more preferably 200 g/10 min or more, and still more preferably 250 g/10 min or more.

When the MFR of the aromatic polysulfone resin is high, in the melt blowing apparatus 500 as shown in FIG. 1, the time from the extrusion of the aromatic polysulfone resin from each of the small holes 14 in the nozzle 16 until the collection thereof on the collecting conveyor 6 will be shortened. That is, the time from the spinning of the fibrous aromatic polysulfone resin until the cooling thereof becomes short. Therefore, it is thought that the fibrous aromatic polysulfone resin is unlikely to solidify before being collected by the collecting conveyor 6, and is likely to form a web of microfibers by self-fusion on the collecting conveyor 6.

It should be noted that in the present specification, the term "web" means a thin film-like sheet composed of fibers.

The MFR of the aromatic polysulfone resin is preferably 400 g/10 min or less. When the MFR of the aromatic polysulfone resin is 400 g/10 min or less, the mechanical strength of the obtained nonwoven fabric improves.

The upper limit value and the lower limit value of the preferable range of MFR in the aromatic polysulfone resin can be arbitrarily combined.

That is, in one aspect, the MFR of the aromatic polysulfone resin is 130 g/10 min or more and 400 g/10 min or less, preferably 150 g/10 min or more and 400 g/10 min or less, more preferably 200 g/10 min or more and 400 g/10 min or less, and still more preferably 250 g/10 min or more and 400 g/10 min or less. In another aspect, the MFR of the aromatic polysulfone resin may be 150 g/10 min or more and 267 g/10 min or less.

[Method for Producing Aromatic Polysulfone Resin]

The aromatic polysulfone resin according to the method for producing a nonwoven fabric of the present embodiment can be suitably produced by polycondensation of the corresponding aromatic dihalogenosulfone compound and the aromatic dihydroxy compound in a polar organic solvent using an alkali metal salt of carbonic acid as a base. For example, a resin having the repeating unit (1) can be suitably produced by using a compound represented by the following formula (4) (hereinafter sometimes referred to as "compound (4)") as an aromatic dihalogenosulfone compound, and using a compound represented by the following formula (5) (hereinafter sometimes referred to as "compound (5)") as an aromatic dihydroxy compound. Further, a resin having the repeating unit (1) and the repeating unit (2) can be suitably produced by using the compound (4) as an aromatic dihalogenosulfone compound, and using a compound represented by the following formula (6) (hereinafter sometimes referred to as "compound (6)") as an aromatic dihydroxy compound. Moreover, a resin having the repeating unit (1) and the repeating unit (3) can be suitably produced by using the compound (4) as an aromatic dihalogenosulfone compound, and using a compound represented by the following formula (7) (hereinafter sometimes referred to as "compound (7)") as an aromatic dihydroxy compound.

$X^1$-Ph$^1$—SO$_2$-Ph$^2$—$X^2$ (4)

[In formula (4), $X^1$ and $X^2$ each independently represent a halogen atom; and Ph$^1$ and Ph$^2$ are the same as defined above.]

HO-Ph$^1$—SO$_2$-Ph$^2$—OH (5)

[In formula (5), Ph$^1$ and Ph$^2$ are the same as defined above.]

HO-Ph$^3$—R-Ph$^4$—OH (6)

[In formula (6), Ph$^3$, Ph$^4$ and R are the same as defined above.]

HO—(Ph$^5$)$_n$—OH (7)

[In formula (7), Ph$^5$ and n are the same as defined above.]

Examples of the compound (4) include bis(4-chlorophenyl) sulfone and 4-chlorophenyl-3',4'-dichlorophenyl sulfone. Examples of the compound (5) include bis(4-hydroxyphenyl) sulfone, bis(4-hydroxy-3,5-dimethylphenyl) sulfone and bis(4-hydroxy-3-phenylphenyl) sulfone. Examples of the compound (6) include 2,2-bis(4-hydroxyphenyl) propane, 2,2-bis(4-hydroxyphenyl) hexafluoropropane, bis(4-hydroxyphenyl) sulfide, bis(4-hydroxy-3-methylphenyl) sulfide and bis(4-hydroxyphenyl) ether. Examples of the compound (7) include hydroquinone, resorcin, catechol, phenylhydroquinone, 4,4'-dihydroxybiphenyl, 2,2'-dihydroxybiphenyl, 3,5,3',5'-tetramethyl-4,4'-dihydroxybiphenyl, 2,2'-diphenyl-4,4'-dihydroxybiphenyl and 4,4'''-dihydroxy-p-quaterphenyl.

It should be noted that examples of the aromatic dihalogenosulfone compound other than the compound (4) include 4,4'-bis(4-chlorophenylsulfonyl) biphenyl. Further, instead of all or part of either or both of the aromatic dihalogenosulfone compound and the aromatic dihydroxy compound, a compound having a halogeno group and a hydroxyl group in a molecule such as 4-hydroxy-4'-(4-chlorophenylsulfonyl) biphenyl can also be used.

The alkali metal salt of carbonic acid may be an alkali carbonate which is a normal salt, an alkali bicarbonate (alkali hydrogen carbonate) which is an acid salt, or a mixture of both. As the alkali carbonate, sodium carbonate or potassium carbonate is preferably used, and as the alkali bicarbonate, sodium bicarbonate or potassium bicarbonate is preferably used.

Examples of the polar organic solvent include dimethylsulfoxide, 1-methyl-2-pyrrolidone, sulfolane (also referred to as 1,1-dioxothiolane), 1,3-dimethyl-2-imidazolidinone, 1,3-diethyl-2-imidazolidinone, dimethyl sulfone, diethyl sulfone, diisopropyl sulfone and diphenyl sulfone.

The amount of the aromatic dihalogenosulfone compound used is usually from 95 to 110 mol %, and preferably from 100 to 105 mol %, with respect to the aromatic dihydroxy compound. The intended reaction is dehydrohalogenation polycondensation of an aromatic dihalogenosulfone compound and an aromatic dihydroxy compound, and if no side reaction occurs, the closer the molar ratio of the two is to 1:1, that is, the closer the amount of the aromatic dihalogenosulfone compound used is to 100 mol % with respect to the aromatic dihydroxy compound, the higher the degree of polymerization of the obtained aromatic polysulfone resin. As a result, the reduced viscosity tends to be high. However, in reality, side reactions such as a substitution reaction of a halogeno group to a hydroxyl group or depolymerization occur by the alkali hydroxide or the like which is produced as a by-product, and the degree of polymerization of the obtained aromatic polysulfone resin is lowered by these side reactions. Therefore, in consideration of the degree of these side reactions, it is necessary to adjust the amount of the aromatic dihalogenosulfone compound used so that an aromatic polysulfone resin having the predetermined reduced viscosity and the predetermined melt mass flow rate can be obtained.

The amount of the alkali metal salt of carbonic acid used is usually from 95 to 115 mol %, and preferably from 100 to 110 mol %, as an alkali metal, with respect to the hydroxyl group of the aromatic dihydroxy compound. If no side reaction occurs, since the intended polycondensation proceeds more rapidly as the amount of the alkali metal salt of carbonic acid used increases, the degree of polymerization of the obtained aromatic polysulfone resin becomes high. As a result, the reduced viscosity tends to be high. However, in reality, the same side reactions as described above are more likely to occur as the amount of the alkali metal salt of carbonic acid used increases, and the degree of polymerization of the obtained aromatic polysulfone resin is lowered by these side reactions. Therefore, in consideration of the degree of these side reactions, it is necessary to adjust the amount of the alkali metal salt of carbonic acid used so that an aromatic polysulfone resin having the predetermined reduced viscosity and the predetermined melt mass flow rate can be obtained.

As a typical method for producing an aromatic polysulfone resin, a method including: as a first step, dissolving an aromatic dihalogenosulfone compound and an aromatic dihydroxy compound in a polar organic solvent; as a second step, adding an alkali metal salt of carbonic acid to the solution obtained in the first step to carry out polycondensation of the aromatic dihalogenosulfone compound and the aromatic dihydroxy compound; and as a third step, removing an unreacted alkali metal salt of carbonic acid, an alkali halide generated as a by-product and the polar organic solvent from the reaction mixture obtained in the second step to obtain an aromatic polysulfone resin can be mentioned.

The dissolution temperature in the first step is usually from 40 to 180° C. Further, the polycondensation temperature in the second step is usually from 180 to 400° C. If no side reaction occurs, since the intended polycondensation proceeds more rapidly as the polycondensation temperature increases, the degree of polymerization of the obtained aromatic polysulfone resin becomes high. As a result, the reduced viscosity tends to be high. However, in reality, the same side reactions as described above are more likely to occur as the polycondensation temperature increases, and the degree of polymerization of the obtained aromatic polysulfone resin is lowered by these side reactions. Therefore, in consideration of the degree of these side reactions, it is necessary to adjust the polycondensation temperature so that an aromatic polysulfone resin having the predetermined reduced viscosity and the predetermined melt mass flow rate can be obtained.

Further, it is usually better to perform the polycondensation in the second step by gradually raising the temperature while removing water generated as a by-product, and after reaching the reflux temperature of the polar organic solvent, the temperature is held usually for 1 to 50 hours, and preferably for 10 to 30 hours. If no side reaction occurs, since the intended polycondensation proceeds more rapidly as the polycondensation time increases, the degree of polymerization of the obtained aromatic polysulfone resin becomes high. As a result, the reduced viscosity tends to be high. However, in reality, the same side reactions as described above are also allowed to proceed as the polycondensation time increases, and the degree of polymerization of the obtained aromatic polysulfone resin is lowered by these side reactions. Therefore, in consideration of the degree of these side reactions, it is necessary to adjust the polycondensation time so that an aromatic polysulfone resin having the predetermined reduced viscosity and the predetermined melt mass flow rate can be obtained.

In the third step, first, the unreacted alkali metal salt of carbonic acid and the alkali halide generated as a by-product are removed from the reaction mixture obtained in the second step by filtration, centrifugation or the like, whereby a solution in which an aromatic polysulfone resin is dissolved in a polar organic solvent can be obtained. Subsequently, an aromatic polysulfone resin can be obtained by removing a polar organic solvent from this solution. Removal of the polar organic solvent may be carried out by distilling off the polar organic solvent directly from the solution, or may be carried out by mixing the solution with a poor solvent for the aromatic polysulfone resin to precipitate the aromatic polysulfone resin, followed by separation by filtration, centrifugation or the like.

Examples of the poor solvent for the aromatic polysulfone resin include methanol, ethanol, isopropyl alcohol, hexane, heptane and water, and methanol is preferable because it is easy to remove.

Further, when a polar organic solvent having a relatively high melting point is used as a polymerization solvent, the reaction mixture obtained in the second step is cooled and solidified, and then pulverized, and while extracting and removing the unreacted alkali metal salt of carbonic acid and the alkali halide generated as a by-product from the obtained powder using water, it is also possible to extract and remove the polar organic solvent using a solvent having no solvency for the aromatic polysulfone resin and having solvency for the polar organic solvent.

Further, as another typical method for producing an aromatic polysulfone resin, a method including: as a first step, reacting an aromatic dihydroxy compound and an alkali metal salt of carbonic acid in a polar organic solvent and removing water generated as a by-product; as a second step, adding an aromatic dihalogenosulfone compound to the reaction mixture obtained in the first step to carry out polycondensation; and as a third step, as described earlier, removing an unreacted alkali metal salt of carbonic acid, an alkali halide generated as a by-product and the polar organic solvent from the reaction mixture obtained in the second step to obtain an aromatic polysulfone resin can be mentioned.

It should be noted that in this alternative method, azeotropic dehydration may be carried out by adding an organic solvent which is azeotroped with water in order to remove the water generated as a by-product in the first step. Examples of the organic solvent which is azeotroped with water include benzene, chlorobenzene, toluene, methyl isobutyl ketone, hexane and cyclohexane. The temperature of the azeotropic dehydration is usually from 70 to 200° C.

Further, in this alternative method, the polycondensation temperature in the second step is usually from 40 to 180° C., and as described earlier, in consideration of the degree of side reactions, it is necessary to adjust the polycondensation temperature and polycondensation time so that an aromatic polysulfone resin having the predetermined reduced viscosity and the predetermined melt mass flow rate can be obtained.

The nonwoven fabric using the aromatic polysulfone resin obtained in this manner is used for various applications because it has high heat resistance and excellent mechanical strength, and is suitably used for applications requiring particularly excellent heat resistance.

[Production Process of Meltblown Nonwoven Fabric]

A method for producing the nonwoven fabric according to an embodiment of the present invention includes the following steps (i) to (iii):

(i) melting an aromatic polysulfone resin by an extruder, (ii) spinning the molten aromatic polysulfone resin from a nozzle in which a large number of small holes are arranged and extending it with a high temperature fluid ejected at high speed from a slit provided so as to sandwich the row of small holes, thereby obtaining a fibrous aromatic polysulfone resin, and (iii) collecting the fibrous aromatic polysulfone resin on a moving collecting member.

A method for producing the nonwoven fabric 100 using the melt blowing apparatus 500 shown in FIG. 1 and FIG. 2 will be described.

First, the molten resin 5 obtained by melting the aromatic polysulfone resin by an extruder (not shown) in step (i) is pressure fed to the melt blowing die 4.

Next, in step (ii), the molten resin 5 is spun out from a large number of small holes 14 in the nozzle 16. At the same time, the fluid 30 is ejected from the slits 31*a* and 31*b*. The molten resin 5 is extended by the fluid 30 to obtain the fibers 10.

Furthermore, in step (iii), the fibers 10 are spread uniformly on the collecting conveyor 6 by the suction mechanism 8. Then, the fibers 10 are bonded on the collecting conveyor 6 by self-fusion to form the nonwoven fabric 100. The obtained nonwoven fabric 100 is sequentially wound up by the take-up roller 11.

The inventors of the present invention conducted intensive studies in order to produce a nonwoven fabric excellent in heat resistance using the melt blowing apparatus 500 and using an aromatic polysulfone resin having a high glass transition temperature. As a result, although the nonwoven fabric was obtained, the mechanical strength of the nonwoven fabric was insufficient in some cases. As a result of examining the nonwoven fabric having low mechanical strength as described above, it was found that few fusion occur between the fibers.

It should be noted that in the present specification, mechanical strength of the nonwoven fabric is evaluated by tensile strength. The tensile strength is a value measured under conditions of a distance between chucks of 5 cm and a measurement temperature of 23° C. using a tensile testing machine for a nonwoven fabric having a size of 10 cm in length and 3 cm in width.

In the case of using an aromatic polysulfone resin having a high glass transition temperature, the following is presumed as a cause for insufficient mechanical strength of the nonwoven fabric. Aromatic polysulfone resins having a high glass transition temperature have high melt temperatures.

Therefore, the temperature difference with the outside air is large, and it is easy to be cooled to less than the temperature to be solidified in a relatively short time after spinning. Consequently, the aromatic polysulfone resin in a fibrous form is easily solidified before being collected on the collecting conveyor 6. For this reason, it is presumed that the fibrous aromatic polysulfone resin is prevented from being self-fused on the collecting conveyor 6 and cannot sufficiently form a web of microfibers. Therefore, it is thought that the nonwoven fabric using an aromatic polysulfone resin having a high glass transition temperature as a forming material has insufficient mechanical strength.

In the case of polyolefin-based resins used as forming materials of conventional nonwoven fabrics, compared with aromatic polysulfone resins, the solidification temperature is low. For this reason, it is thought that in the conventional production method, such problems caused by the solidification temperature of the resin were not recognized.

The inventors of the present invention have found that the above problems can be solved by intensively examining the conditions for producing a nonwoven fabric by a melt blowing method, and completed the present invention. That is, in the production method of the present embodiment, it was found that the above problems can be solved by setting the distance from the tip of the nozzle 16 to the collecting conveyor 6 to 30 mm or less in step (iii) to complete the present invention. When the distance from the tip of the nozzle 16 to the collecting conveyor 6 is 30 mm or less, the fibrous aromatic polysulfone resin is unlikely to solidify before being collected by the collecting conveyor 6. For this reason, it can be self-fused to sufficiently form a web of microfibers when being collected on the collecting conveyor 6. Therefore, according to the above conditions, a nonwoven fabric excellent in mechanical strength can be obtained.

In the production method of the present embodiment, the distance from the tip of the nozzle 16 to the collecting conveyor 6 is preferably 10 mm or more and 30 mm or less, more preferably 15 mm or more and 25 mm or less, and still more preferably 15 mm or more and 20 mm or less.

In another aspect, the distance from the tip of the nozzle 16 to the collecting conveyor 6 may be from 20 to 25 mm.

The cylinder temperature of the extruder in the above step (i) is from 330° C. to 410° C., preferably from 350° C. to 400° C., and more preferably from 370° C. to 400° C. Within the above range, the higher the cylinder temperature, the less likely the fibrous aromatic polysulfone resin solidifies before being collected by the collecting conveyor 6. Therefore, the fibrous aromatic polysulfone resin can be self-fused to sufficiently form a web of microfibers when being collected on the collecting conveyor 6.

The fluid 30 is not particularly limited as long as it can be usually used in the method for producing a nonwoven fabric by the melt blowing method. Examples of the fluid 30 include air, inert gases such as nitrogen, and the like. The temperature of the fluid 30 may be set to a temperature higher than the cylinder temperature, and for example, may be a temperature 20 to 50° C. higher, preferably a temperature 50° C. higher, than the cylinder temperature. For example, when the temperature of the fluid 30 is higher than the above cylinder temperature by 50° C., it is difficult to cool the aromatic polysulfone resin. Therefore, the fibrous aromatic polysulfone resin is easily self-fused to sufficiently form a web of microfibers when being collected on the collecting conveyor 6.

The ejection amount of the fluid 30 may be set according to the average fiber diameter of the nonwoven fabric to be required. The ejection amount of the fluid 30 is usually in the range of 500 L/min or more and 900 L/min or less. When the ejection amount of the fluid 30 is 500 L/min or more, the molten aromatic polysulfone resin can be sufficiently extended. On the other hand, when the ejection amount of the fluid 30 is 900 L/min or less, the flow of the fluid 30 is less likely to be disturbed, and the nonwoven fabric can be stably obtained.

It should be noted that the hole diameter of the slit from which the fluid 30 is ejected is preferably from 0.1 to 0.5 mm.

A single hole discharge amount of the aromatic polysulfone resin is usually 0.05 g/min or more and 3.0 g/min or less, and preferably in the range of 0.1 g/min or more and 2.0 g/min or less. When the discharge amount of the aromatic polysulfone resin is 0.05 g/min or more, the productivity improves. On the other hand, when the discharge amount of the aromatic polysulfone resin is 3.0 g/min or less, the molten aromatic polysulfone resin can be sufficiently extended.

The moving speed of the collecting conveyor 6 may be set in accordance with the basis weight of the required nonwoven fabric. The moving speed of the collecting conveyor 6 is usually 1 m/min or more and 20 m/min or less, preferably 3 n/min or more and 15 m/min or less, and more preferably 5 m/min or more and 5.5 m/min or less. The collecting conveyor 6 may be set to room temperature (15 to 30° C.), but may be heated (for example, 30 to 100*C) if necessary. It should be noted that in the nonwoven fabric according to the production method of the present embodiment, the term "basis weight" is a unit representing the mass per unit area, which means the number of grams per 1 m$^2$ of the nonwoven fabric. The basis weight of the nonwoven fabric according to the production method of the present embodiment is preferably, for example, 5 g/m$^2$ or more and 30 g/m$^2$ or less.

According to the method for producing a nonwoven fabric as described above, a nonwoven fabric having excellent heat resistance and excellent mechanical strength can be obtained.

In one aspect, in the nonwoven fabric obtained by the production method of the present embodiment, it is preferable that the average fiber diameter of the fibers formed from the aromatic polysulfone resin constituting the nonwoven fabric is 3 μm or more and 8 μm or less. It should be noted that the expression "average fiber diameter of the nonwoven fabric" referred to here means an average of values obtained by enlarging and photographing the nonwoven fabric with a scanning electron microscope and measuring diameters of 20 arbitrary fibers from the obtained photograph.

The thickness of the nonwoven fabric is preferably from 10 to 100 μm. It should be noted that the "thickness of the nonwoven fabric" can be measured by a micrometer.

Although the preferred embodiments according to the present invention have been described above with reference to the accompanying drawings, it goes without saying that the present invention is not limited to such examples. Various shapes, combinations, and the like for the respective constituent members shown in the above-described example are merely examples, and various changes and modifications can be made based on design requirements or the like without departing from the spirit and scope of the present invention.

Another aspect of the method for producing a nonwoven fabric of the present embodiment includes steps for:

spinning a molten aromatic polysulfone resin from a nozzle and extending it with a high temperature fluid ejected at high speed, thereby obtaining the aforementioned aromatic polysulfone resin in a fibrous form; and collecting the aforementioned aromatic polysulfone resin obtained in a fibrous form on a moving collecting member;

wherein the distance from the tip of the aforementioned nozzle to the aforementioned collecting member is set to 10 mm or more and 30 mm or less, preferably 15 mm or more and 25 mm or less, and more preferably 15 mm or more and 20 mm or less, or may be set to 20 to 25 mm;

the cylinder temperature of the aforementioned extruder is set to 330° C. to 410° C., preferably from 350° C. to 400° C., and more preferably from 370° C. to 400° C.;

the aforementioned aromatic polysulfone resin is an aromatic polysulfone resin in which a content of a repeating unit represented by the above formula (1) is from 80 mol % to 100 mol % with respect to the total amount of all the repeating units constituting the aforementioned thermoplastic resin, preferably an aromatic polysulfone resin obtained by polycondensation of bis(4-hydroxyphenyl) sulfone and bis(4-chlorophenyl) sulfone; and the melt mass flow rate of the aforementioned aromatic polysulfone resin under the conditions of a test temperature of 400° C. and a nominal load of 2.16 kg determined based on ASTM D 1238 is 130 g/10 min or more and 400 g/10 min or less, preferably 150 g/10 min or more and 400 g/10 min or less, more preferably 200 g/10 min or more and 400 g/10 min or less, and still more preferably 250 g/10 min or more and 400 g/10 min or less, or 150 g/10 min or more and 267 g/10 min or less.

Furthermore, in the aforementioned nonwoven fabric, the tensile strength may be 4 N/3 cm or more and 8 N/3 cm or less, preferably 6 N/3 cm or more and 7 N/3 cm or less;

the average fiber diameter may be 3 μm or more and 8 μm or less;

the basis weight may be 5 g/m² or more and 30 g/m² or less; and the thickness may be from 10 to 100 μm.

EXAMPLES

The present invention will be described below based on examples. However, the present invention is not limited to these examples. Further, the physical properties of the aromatic polysulfone resin used in the following examples were measured in the following manner.

[Measurement of Reduced Viscosity]

1 g of an aromatic polysulfone resin was dissolved in N,N-dimethylformamide to adjust the volume to 1 dL. The viscosity ($\eta$) of this solution was measured at 25° C. using an Ostwald type viscosity tube. In addition, the viscosity ($\eta 0$) of N,N-dimethylformamide as a solvent was measured at 25° C. using an Ostwald type viscosity tube. Since the concentration of the above solution is 1 g/dL, the value of the specific viscosity (($\eta-\eta 0$)/$\eta 0$) will be the value of the reduced viscosity in the unit of dL/g.

[Measurement of Melt Mass Flow Rate (MFR)]

A discharge amount (g) when the aromatic polysulfone resin was discharged for 15 seconds under conditions of a temperature of 400° C., a load of 2.16 kg, a die inner diameter of 2.095 mm and a preheating time of 7 minutes was measured using a melt indexer D4003 manufactured by Dynisco Japan, Ltd. in accordance with ASTM D1238. The obtained discharge amount was converted to a discharge amount (g) per 10 minutes to be used as an MFR value.

Production of Aromatic Polysulfone Resin

Production Example 1

500 g of 4,4'-dihydroxydiphenyl sulfone, 600 g of 4,4'-dichlorodiphenyl sulfone and 978 g of diphenyl sulfone as a polymerization solvent were charged into a polymerization vessel equipped with a stirrer, a nitrogen inlet tube, a thermometer and a condenser attached with a receiver at the tip thereof, and the temperature was raised to 180° C. as the polymerization temperature indicated by the above-mentioned thermometer while causing nitrogen gas to circulate inside the system. After adding 287 g of potassium carbonate to the obtained solution, the temperature was gradually raised to 290° C., and the reaction was further carried out at 290° C. for 4 hours. The obtained reaction solution was cooled to room temperature to solidify and finely pulverized, and then washed with warm water, and further washed several times with a mixed solvent of acetone and methanol. Subsequently, the solid obtained after washing was dried by heating at 150° C. to obtain an aromatic polysulfone resin in the form of a powder. As a result of measuring the reduced viscosity of this aromatic polysulfone resin, the reduced viscosity was 0.31 dL/g.

Subsequently, the obtained aromatic polysulfone resin was supplied to a cylinder of a twin screw extruder ("PCM-30 model" manufactured by Ikegai Ironworks Corp), and melt-kneaded at a cylinder temperature of 360° C. and extruded, thereby obtaining a strand. By cutting this strand, pellets of the aromatic polysulfone resin were obtained. As a result of measuring MFR of this aromatic polysulfone resin, the MFR was 267 g/10 min.

Production Example 2

500 g of 4,4'-dihydroxydiphenyl sulfone, 597 g of 4,4'-dichlorodiphenyl sulfone and 974 g of diphenyl sulfone as a polymerization solvent were charged into a polymerization vessel equipped with a stirrer, a nitrogen inlet tube, a thermometer and a condenser attached with a receiver at the tip thereof, and the temperature was raised to 180° C. as the polymerization temperature indicated by the above-mentioned thermometer while causing nitrogen gas to circulate inside the system. After adding 287 g of potassium carbonate to the obtained solution, the temperature was gradually raised to 290° C., and the reaction was further carried out at 290° C. for 4 hours. The obtained reaction solution was cooled to room temperature to solidify and finely pulverized, and then washed with warm water, and further washed several times with a mixed solvent of acetone and methanol. Subsequently, the solid obtained after washing was dried by heating at 150° C. to obtain an aromatic polysulfone resin in the form of a powder. As a result of measuring the reduced viscosity of this aromatic polysulfone resin, the reduced viscosity was 0.36 dL/g.

Subsequently, the obtained aromatic polysulfone resin was supplied to a cylinder of a twin screw extruder ("PCM-30 model" manufactured by Ikegai Ironworks Corp), and melt-kneaded at a cylinder temperature of 360° C. and extruded, thereby obtaining a strand. By cutting this strand, pellets of the aromatic polysulfone resin were obtained. As a result of measuring MFR of this aromatic polysulfone resin, the MFR was 150 g/10 min.

Production Example 3

500 g of 4,4'-dihydroxydiphenyl sulfone, 594 g of 4,4'-dichlorodiphenyl sulfone and 970 g of diphenyl sulfone as a polymerization solvent were charged into a polymerization vessel equipped with a stirrer, a nitrogen inlet tube, a thermometer and a condenser attached with a receiver at the tip thereof, and the temperature was raised to 180° C. as the polymerization temperature indicated by the above-mentioned thermometer while causing nitrogen gas to circulate inside the system. After adding 287 g of potassium carbonate to the obtained solution, the temperature was gradually raised to 290° C., and the reaction was further carried out at 290° C. for 4 hours. The obtained reaction solution was cooled to room temperature to solidify and finely pulverized, and then washed with warm water, and further washed several times with a mixed solvent of acetone and methanol. Subsequently, the solid obtained after washing was dried by heating at 150° C. to obtain an aromatic polysulfone resin in the form of a powder. As a result of measuring the reduced viscosity of this aromatic polysulfone resin, the reduced viscosity was 0.41 dL/g.

Subsequently, the obtained aromatic polysulfone resin was supplied to a cylinder of a twin screw extruder ("PCM-30 model" manufactured by Ikegai Ironworks Corp), and melt-kneaded at a cylinder temperature of 360° C. and extruded, thereby obtaining a strand. By cutting this strand, pellets of the aromatic polysulfone resin were obtained. As a result of measuring MFR of this aromatic polysulfone resin, the MFR was 51 g/10 min.

Production of Meltblown Nonwoven Fabric

Example 1

A meltblown nonwoven fabric using the aromatic polysulfone resin of Production Example 1 as a forming material was produced using a meltblown nonwoven fabric production apparatus configured in the same manner as that of the apparatus shown in FIG. 1 and having a nozzle with 201 holes and a hole diameter of 0.25 mm. The details will be described below.

First, the aromatic polysulfone resin of Production Example 1 was extruded by a single screw extruder and melted at a cylinder temperature of 400° C. Next, the molten resin was supplied to a melt blowing die of the meltblown nonwoven fabric production apparatus. Further, the molten resin was extruded from the holes (small holes) of the nozzle provided in the melt blowing die. At the same time, hot air of 450° C. (high temperature fluid ejected at high speed) was ejected at a condition of 850 L/min from slits on both sides of the nozzle to extend the extruded aromatic polysulfone resin. Furthermore, the obtained fibrous aromatic polysulfone resin was collected on a collecting conveyor made of a stainless steel wire mesh installed below the nozzle. The nonwoven fabric formed on the conveyor was peeled off to obtain a meltblown nonwoven fabric using the aromatic polysulfone resin as a forming material. The production conditions of Example 1 are shown in Table 1.

Example 2

A meltblown nonwoven fabric of an aromatic polysulfone resin was obtained in the same manner as in Example 1, except that the aromatic polysulfone resin of Production Example 2 was used, and the distance from the nozzle to the collecting conveyor and the moving speed of the collecting conveyor were changed.

Comparative Example 1

A meltblown nonwoven fabric of an aromatic polysulfone resin was obtained in the same manner as in Example 1, except that the aromatic polysulfone resin of Production Example 1 was used, and the distance from the nozzle to the collecting conveyor was changed.

Comparative Example 2

A meltblown nonwoven fabric of an aromatic polysulfone resin was obtained in the same manner as in Example 2, except that the aromatic polysulfone resin of Production Example 2 was used, and the distance from the nozzle to the collecting conveyor and the moving speed of the collecting conveyor were changed.

Comparative Example 3

A meltblown nonwoven fabric of an aromatic polysulfone resin was obtained in the same manner as in Example 1 using the aromatic polysulfone resin of Production Example 3.

<Evaluation>

The following measurements were carried out for each of the nonwoven fabrics of Examples 1 and 2 and Comparative Examples 1 to 3. The results are shown in Table 1.

[Measurement of Average Fiber Diameter]

Each nonwoven fabric was magnified and photographed with a scanning electron microscope to obtain a photograph. An average of values obtained by measuring diameters of 20 fibers arbitrarily chosen from the obtained photograph was calculated.

[Measurement of Tensile Strength]

Each nonwoven fabric was cut into a size of 10 cm in length and 3 cm in width and used as a test piece. The tensile strength of this test piece was measured under conditions of a distance between chucks of 5 cm and a measurement temperature of 23° C. using a tensile testing machine (Autograph AG-1 kNIS) manufactured by Shimadzu Corporation. The tensile strength is represented by the maximum load [N/3 cm] per width of the test piece until the test piece fractures.

Each nonwoven fabric was evaluated based on the following criteria from the result of this tensile test.

A: Tensile strength of 4 N/3 cm or more
B: Tensile strength of less than 4 N/3 cm

TABLE 1

| | | Ex. 1 | Ex. 2 | Comp. Ex. 1 | Comp. Ex. 2 | Comp. Ex. 3 |
|---|---|---|---|---|---|---|
| Aromatic polysulfone resin | MFR [g/10 min] | 267 | 150 | 267 | 150 | 51 |
| Production conditions of nonwoven fabric | Distance from nozzle to collecting conveyor [mm] | 25 | 20 | 60 | 35 | 25 |
| | Moving speed of collecting conveyor [m/min] | 5.5 | 5.0 | 5.5 | 5.5 | 5.5 |

TABLE 1-continued

|  |  | Ex. 1 | Ex. 2 | Comp. Ex. 1 | Comp. Ex. 2 | Comp. Ex. 3 |
|---|---|---|---|---|---|---|
| Evaluation of nonwoven fabric | Average fiber diameter [μm] | 5.3 | 6.9 | 5.7 | 6.3 | 7.2 |
|  | Tensile strength [N/3 cm] | 6 | 7 | 2 | 2 | 3 |
|  | Judgment | A | A | B | B | B |

As shown in Table 1, the nonwoven fabrics of Examples 1 and 2 to which the production method of the present invention was applied were excellent in tensile strength.

On the other hand, the nonwoven fabrics of Comparative Examples 1 and 2 were inferior in tensile strength, although they had average fiber diameters equivalent to those of the nonwoven fabrics of Examples 1 and 2. It is thought that this is due to solidification before being collected on the collecting conveyor which is caused by the long distance from the nozzle to the collecting conveyor. Therefore, it is considered that the tensile strength of the nonwoven fabric was low because it was not possible to self-fuse on the collecting conveyor to sufficiently form a web of microfibers.

Further, the nonwoven fabric of Comparative Example 3 was also inferior in tensile strength, although the average fiber diameter was equivalent to those of the nonwoven fabrics of Examples 1 and 2. It is thought that this is due to solidification before being collected on the collecting conveyor which is caused by the low MFR of the aromatic polysulfone resin and the low fluidity of the resin.

Therefore, it is considered that the tensile strength of the nonwoven fabric was low because it was not possible to self-fuse on the collecting conveyor to sufficiently form a web of microfibers.

From the above results, it was confirmed that the present invention is useful.

INDUSTRIAL APPLICABILITY

The present invention is extremely useful industrially because it can provide a method for producing a nonwoven fabric, by which a nonwoven fabric having excellent heat resistance and excellent mechanical strength can be obtained.

REFERENCE SIGNS LIST

5: Molten resin; 6: Collecting conveyor (collecting member); 10: Fiber; 14: Small hole; 16: Nozzle; 30: High temperature fluid ejected at high speed; 31*a*, 31*b*: Slit; 100: Nonwoven fabric

The invention claimed is:
1. A method for producing a nonwoven fabric, the method comprising:
spinning a molten aromatic polysulfone resin from a nozzle and extending it with a high temperature fluid ejected at high speed, thereby obtaining said aromatic polysulfone resin in a fibrous form; and
collecting said aromatic polysulfone resin obtained in a fibrous form on a moving collecting member;
wherein said aromatic polysulfone resin has a melt mass flow rate of 130 g/10 min or more under conditions of a test temperature of 400° C. and a nominal load of 2.16 kg, which is determined based on ASTM D 1238; and
a distance from said nozzle to said collecting member is set to 30 mm or less.

2. The method for producing a nonwoven fabric according to claim 1, wherein a content of a repeating unit represented by the following formula (1) in said aromatic polysulfone resin is from 80 mol % to 100 mol % with respect to a total amount of all repeating units constituting said aromatic polysulfone resin:

-Ph$^1$—SO$_2$-Ph$^2$—O—     (1)

wherein Ph$^1$ and Ph$^2$ represent a phenylene group; and at least one hydrogen atom in said phenylene group may each independently be substituted with an alkyl group having 1 to 10 carbon atoms, an aryl group having 6 to 20 carbon atoms or a halogen atom.

3. The method for producing a nonwoven fabric according to claim 1, wherein the melt mass flow rate of the aromatic polysulfone resin is 400 g/10 min or less.

4. The method for producing a nonwoven fabric according to claim 1, further comprising melting the aromatic polysulfone resin by an extruder, wherein a cylinder temperature of the extruder is from 330° C. to 410° C.

5. The method for producing a nonwoven fabric according to claim 4, wherein the high temperature fluid is set to a temperature 20 to 50° C. higher than the cylinder temperature.

6. The method for producing a nonwoven fabric according to claim 1, wherein the nonwoven fabric has a tensile strength of 4 N/3 cm or more and 8 N/3 cm or less.

7. The method for producing a nonwoven fabric according to claim 1, wherein the nonwoven fabric has an average fiber diameter of 3 μm or more and 8 μm or less.

8. The method for producing a nonwoven fabric according to claim 1, wherein the nonwoven fabric has a basis weight of 5 g/m$^2$ or more and 30 g/m$^2$ or less.

9. The method for producing a nonwoven fabric according to claim 1, wherein the nonwoven fabric has a thickness of from 10 to 100 μm.

* * * * *